3,518,063
PURIFICATION OF BERYLLIUM BY LIQUID-LIQUID EXTRACTION

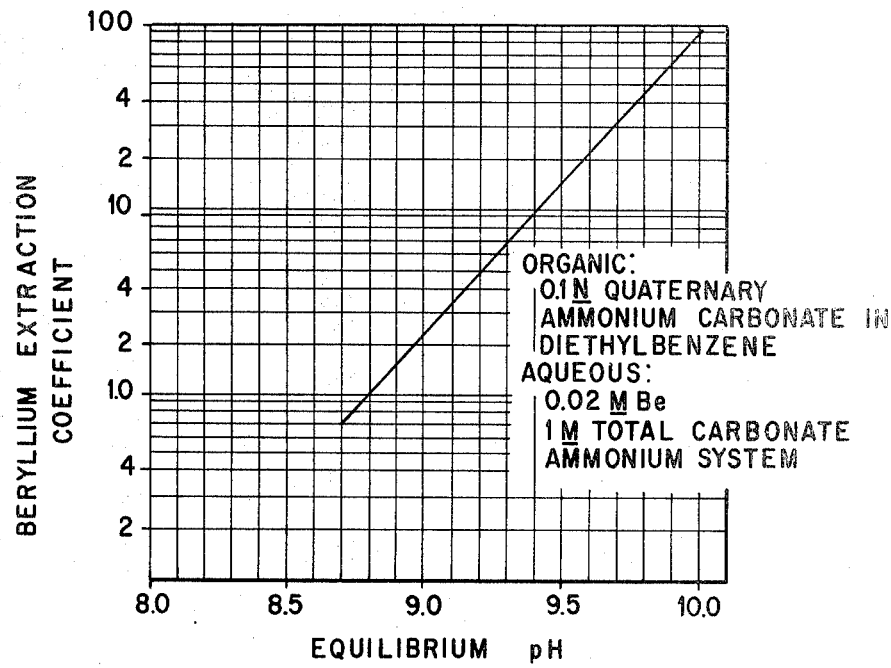
Fig. 1
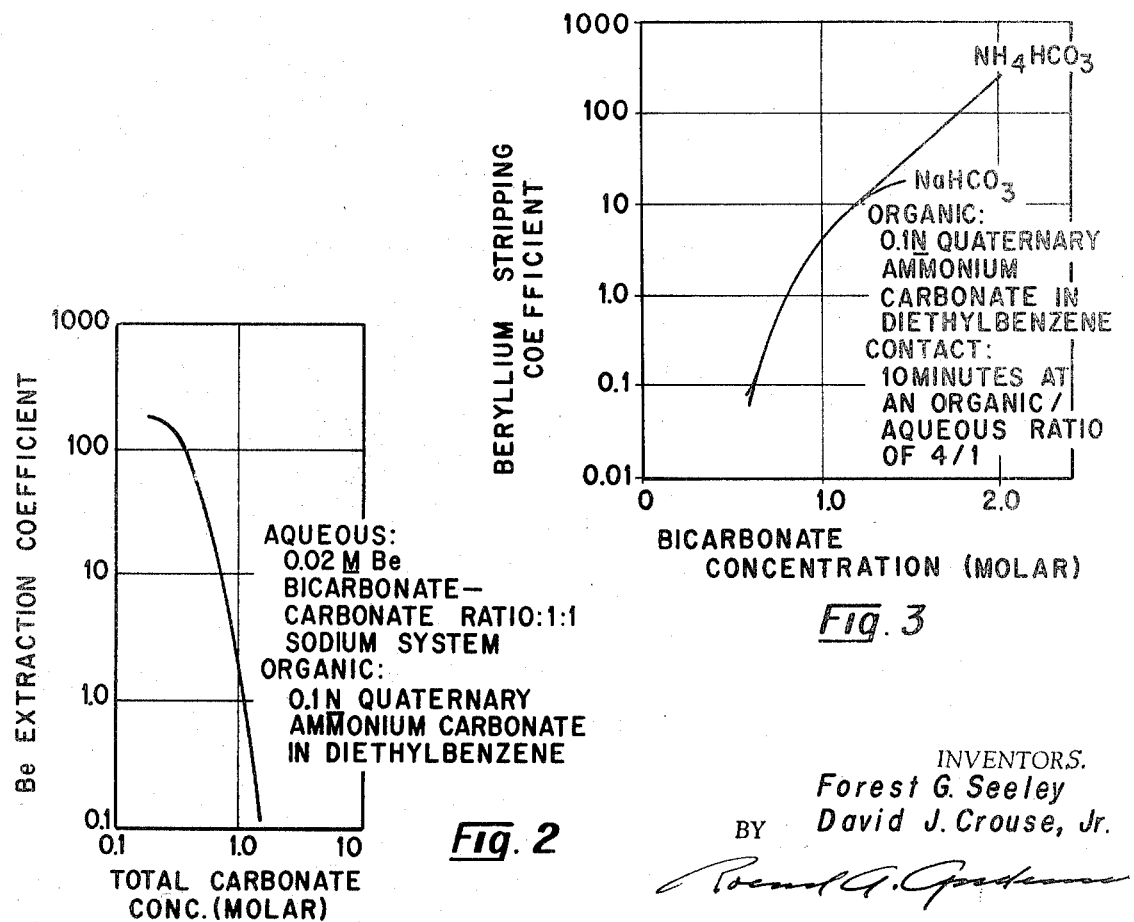
Fig. 2
Fig. 3
INVENTORS.
Forest G. Seeley
David J. Crouse, Jr.
BY
ATTORNEY.

Forest G. Seeley and David J. Crouse, Jr., Oak Ridge, Tenn., assignors to the United States of America as represented by the United States Atomic Energy Commission
Filed Oct. 3, 1967, Ser. No. 672,649
Int. Cl. C01f 3/00; B01d 11/04
U.S. Cl. 23—312                                    10 Claims

ABSTRACT OF THE DISCLOSURE

A method of separating beryllium values from extraneous impurities comprising selectively extracting beryllium values from an aqueous alkaline carbonate solution with an organic solution of a quaternary ammonium carbonate containing 39 to 75 carbon atoms and having at least one methyl group attached to each nitrogen atom.

BACKGROUND OF THE INVENTION

This invention was made in the course of, or under, a contract with the U.S. Atomic Energy Commission.

Our invention relates to methods of separating beryllium values from a mixture of said values and extraneous impurities.

Although processes have been developed for producing relatively pure beryllium from beryllium-bearing ores, these processes require many time-consuming steps and the use of expensive chemicals to produce beryllium having the high purity required in nuclear and some metallurgical applications.

SUMMARY OF THE INVENTION

It is accordingly one object of our invention to provide an improved method of purifying beryllium.

It is another object to provide a liquid-liquid extraction method of purifying beryllium which can be used in an alkaline system.

It is still another object to provide a method for purifying beryllium which can readily be incorporated into existing beryllium processing steps.

Other objects of our invention will be apparent from the following description and attached claims.

In accordance with our invention we have provided a method of removing beryllium values from an aqueous alkaline carbonate solution containing said values comprising contacting said solution with an organic solution comprising a water-immiscible diluent and a quaternary ammonium carbonate containing 39 to 75 carbon atoms and represented by the formula

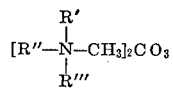

where R' is selected from the group consisting of alkyl and aryl radicals and R" and R''' are alkyl radicals and when R' is an alkyl radical, R" and R''' each contain at least 6 carbon atoms and when R' is an aryl radical R" is a methyl radical and R''' contains at least 17 carbon atoms, thereby extracting beryllium values into the organic solution.

Our method is capable of producing beryllium having the high purity required for nuclear applications. The extraction step and the associated scrubbing and stripping steps are all carried out in an alkaline system. Compared to acid extraction systems, the alkaline system provides increased separation from contaminant metals such as iron, aluminum, calcium, and magnesium that are only slightly soluble in the alkaline feed solution, providing partial separation from beryllium in the dissolution step.

BRIEF DESCRIPTION OF THE DRAWINGS

The figures are graphs showing the effect on the beryllium extraction coefficient of several process variables.

FIG. 1 shows the influence of the equilibrium pH of the aqueous solution on the extraction power for beryllium of a typical quaternary ammonium compound.

FIG. 2 shows the effect on the beryllium extraction coefficient of the concentration of total carbonate in the aqueous phase at a mole ratio of bicarbonate to carbonate of 1:1.

FIG. 3 shows the effect of the concentration of bicarbonate in an aqueous solution on its ability to strip beryllium values from an organic solution.

DESCRIPTION OF THE PREFERRED EMBODIMENTS

In carrying out our invention, an aqueous alkaline carbonate solution containing beryllium values is contacted with an organic solution of a quaternary ammonium compound.

In the typical process using our invention the starting material is a beryllium hydroxide precipitate such as is produced in some ore processing steps. Contacting this precipitate with a bicarbonate solution dissolves it. The stoichiometric amount of bicarbonate for the dissolution is 2 moles of bicarbonate per mole of beryllium according to the following reaction:

A small excess of bicarbonate or some normal carbonate can be added to the system to increase the dissolution rate, but this is not required. The sum of the concentrations of carbonate and bicarbonate is referred to herein as the "total carbonate" concentration. The total carbonate concentration in the aqueous feed solution must not exceed 1.2 molar, is at least 0.2 molar, and is preferably from 0.5 to 1.0 molar. The molar ratio of bicarbonate/carbonate should never exceed a value of 3:1, a value suitable for a total carbonate concentration of 0.5 molar or lower. For total carbonate concentrations of 0.8 molar and higher, the bicarbonate/carbonate ratio should be less than 0.5.

The pH of the solution is a convenient indication of the bicarbonate/carbonate ratio. The pH level can be raised by adding a hydroxide and can be lowered by adding a bicarbonate. For the ammonium carbonate-bicarbonate system a pH of 8–10 indicates a suitable ratio for total carbonate concentrations less than 0.8 molar; a pH of 8.5–10 indicates a suitable ratio for total carbonate concentrations higher than 0.8 molar. For the sodium or potassium carbonate-bicarbonate systems a pH of 9–11 indicates a suitable ratio for total carbonate concentrations of 0.8 molar or lower; a pH of 9.5–11 indicates a suitable ratio for total carbonate concentrations higher than 0.8 molar.

The organic solution comprises a quaternary ammonium carbonate in an organic diluent. We have discovered that this compound must contain 39 to 75 carbon atoms and at least one methyl radical attached to each nitrogen atom. One of the radicals attached to each nitrogen atom can be an aromatic radical, but when an aromatic radical is present at least two methyl radicals must be attached to the nitrogen atom and the fourth radical must be a long-chain alkyl radical containing at least 17 carbon atoms. Where there are no aryl radicals present at least two of the alkyl radicals attached to the nitrogen atom must contain at least 6 carbon atoms each.

Typical examples of the quaternary ammonium carbonates which may be used are trihexylmethyl ammonium carbonate, tridodecylmethyl ammonium carbonate, didecyldimethyl ammonium carbonate, dihexadecyldimethyl ammonium carbonate, and N-benzyl-N-N-dimethyl-N-heptadecyl ammonium carbonate.

The following table shows the effectiveness of four quaternary extractants which meet these criteria as compared with four which do not.

TABLE I.—EXTRACTION OF Be WITH VARIOUS QUATERNARY AMMONIUM COMPOUNDS

Organic: 0.1 normal quaternary ammonium carbonate in 96.5% diethylbenzene-3.5% tridecanol
Aqueous: 0.01 molar Be, 0.2 molar $NaHCO_3$, 0.8 molar $Na_2CO_3$, pH=10

| Quaternary ammonium compound: | Beryllium extraction coefficient (organic/ aqueous) |
|---|---|
| (1) Didodecyldimethyl ammonium carbonate | 7.4 |
| (2) $[R_3(CH_3)N]_2CO_3$ [1] | 5.3 |
| (3) $[R_3(CH_3)N]_2CO_3$ [2] | 5.5 |
| (4) N-benzyl-N-N-dimethyl-(1-hendecyldodecyl) ammonium carbonate | 4.3 |
| (5) $[R_3(Y)N]_2CO_3$ [3] | 0.003 |
| (6) Tetraheptyl ammonium carbonate | 0.008 |
| (7) Trioctylpropyl ammonium carbonate | 0.008 |
| (8) Hexadecyltrimethyl ammonium carbonate | 0.003 |

[1] $R_3$=55 percent n-octyl and 45 percent n-decyl groups.
[2] $R_3$=60 percent n-octyl, 33 percent n-decyl, 5 percent n-hexyl, and 2 percent n-dodecyl groups.
[3] $R_3$=55 percent n-octyl and 45 percent n-decyl groups, and Y=dodecylbenzyl.

The quaternary compound, if obtained in a form other than the carbonate, such as the chloride or bromide, may be converted to the carbonate prior to extraction by contacting it with an aqueous carbonate solution.

The organic diluent may be selected from a wide range of liquid organic compounds. The diluent selected must be immiscible with water and capable of dissolving the quaternary compound and the extracted beryllium salt. The aliphatic hydrocarbons such as kerosene, heptane, and n-dodecane; the aromatic hydrocarbons such as benzene, toluene, and other commercial aromatic petroleum products; and chlorinated hydrocarbons such as carbon tetrachloride are examples of typically useful organic diluents.

Some of the diluents, particularly the aliphatic hydrocarbons, should be modified by adding a small amount of a long-chain alcohol such as tridecanol to the organic phase in order to prevent third phase formation and to improve the phase separation characteristics of the diluent.

The concentration of the quaternary ammonium compound in the diluent is not critical, since some beryllium is extracted regardless of the concentration; however, the most useful range is from 0.1 to 0.6 normal and the preferred concentration is in the range of 0.3 to 0.5 normal.

The organic solution, containing extracted beryllium values, may then be scrubbed with a carbonate solution if additional purification of beryllium is needed. The concentration of total carbonate in this scrub solution must be no greater than 1 molar and it is preferably in the range of 0.1 to 0.5. The scrub solution can contain pure carbonate or bicarbonate or mixtures of these in any desired ratio.

The organic solution, scrubbed if desired, is then contacted with an aqueous solution containing either carbonate, bicarbonate, or a mixture of the two to strip beryllium values from it. In the preferred method of carrying out our process bicarbonate is used, and FIG. 3 shows the beryllium stripping coefficient as a function of bicarbonate concentration. The concentration of total carbonate in the stripping solution should be greater than 1 molar and is preferably 1.5 to 2.0 molar. The stripping effectiveness of a solution containing bicarbonate and carbonate in a mole ratio of 1:1 as a function of total carbonate concentration can be determined from FIG. 2.

The aqueous stripping solution containing the beryllium values may be processed in the same manner as any alkaline beryllium solution.

Having thus described our invention, the following example is offered to illustrated it in more detail.

EXAMPLE

A beryllium sulfate solution was prepared having the composition in Table II below.

TABLE II

| Constituent: | Concentration (grams/liter) |
|---|---|
| Be | 2.09 |
| Al | 0.55 |
| Fe(III) | 0.55 |
| Mg | 0.55 |
| Ca | 0.28 |
| Mn | 0.28 |
| V(IV) | 0.14 |
| $SO_4$ | 65 |

Sufficient ammonium hydroxide was added to 360 milliliters of this solution to raise the pH to 8.5. A precipitate formed which was digested for 1 hour at 45° C. after which it was filtered and washed with 0.03 molar $NH_4OH$. The precipitate was then reslurried with 200 milliliters of 0.03 molar $NH_4OH$, digested for 30 minutes at 45° C., and again filtered and washed. The washed precipitate was slurried in 360 milliliters of a solution 0.6 molar in $NaHCO_3$ and 0.2 molar in $Na_2CO_3$ (approximately 2.5 moles of $NaHCO_3$/mole of Be) and digested for one hour at 70° C. to dissolve the beryllium. The residue containing most of the metal contaminants was discarded.

The resulting beryllium solution contained about 98 percent of the original beryllium at a concentration of 1.93 grams per liter and its pH was 9.7. The pH was adjusted to 10 by adding NaOH and this solution was used as the aqueous feed to a countercurrent batch system having two extraction stages and one scrubbing stage. This feed solution was contacted with an organic solution 0.45 normal in a quaternary ammonium carbonate containing the group

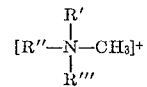

where R', R", and R''' are primarily n-octyl and n-decyl groups. The diluent was 95 percent diethylbenzene-5 percent tridecanol. The scrub solution contained 0.2 molar total carbonate at a pH of 10. The organic/aqueous feed/ scrub ratios were 1.0/1.15/0.25. The stage contact time was about 5 minutes. The aqueous raffinate contained 0.16 gram Be/liter.

The organic phase, containing about 1.8 grams Be/liter, was stripped by eight successive contacts with 1.5 molar $NH_4HCO_3$, each at an organic/aqueous phase ratio of 10/1. This removed 98.4 percent of the beryllium from the organic phase. The combined strip solutions containing 2.4 grams Be per liter were heated for 30 minutes at 95° C. thereby precipitating over 99.9 percent of the beryllium. The precipitate was filtered, washed with water, and calcined at 950° C. to give a product over 99.9 percent BeO.

Analyses of the original beryllium-containing solution, the feed solution, and the product gave the data in Table III.

TABLE III.—PURIFICATION OF BERYLLIUM

| Impurity | Concentration, parts per million parts of BeO ||||
| | Beryllium sulfate solution | Carbonate feed solution | Strip solution | BeO product |
|---|---|---|---|---|
| Al | 95,000 | 3,700 | 750 | 100 |
| Fe | 95,000 | 1,900 | 750 | 200 |
| Mg | 95,000 | 900 | 300 | 20 |
| Mn | 48,000 | 400 | 300 | 20 |
| Ca | 48,000 | | | 100 |
| V | 24,000 | 13,000 | 1,500 | 300 |

As can be seen from the foregoing example, our process not only produces a highly pure beryllium mass, but is readily incorporated into other processes.

The foregoing example is intended to illustrate, not to limit, our invention. It is obvious that changes may be made in the content of the feed and organic solutions, and in the methods of carrying out the various steps without departing from our invention. For instance, more extraction stages or scrubbing stages may be used, which will greatly increase the degree of purity of the product.

We claim:

1. A method of removing beryllium values from an aqueous alkaline carbonate solution containing said values comprising contacting said solution with an organic solution comprising a water-immiscible diluent and a quaternary ammonium carbonate containing 39 to 75 carbon atoms and represented by the formula

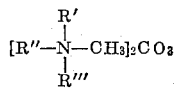

where R' is selected from the group consisting of alkyl and aryl radicals, and R" and R''' are alkyl radicals and when R' is an alkyl radical R" and R''' each contain at least 6 carbon atoms, and when R' is an aryl radical R" is a methyl radical and R''' contains at least 17 carbon atoms, thereby extracting beryllium values into the organic solution.

2. The method of claim 1 wherein the pH of the aqueous alkaline solution is at least 8.

3. The method of claim 1 wherein the pH of the aqueous alkaline solution is in the range of 8 to 11.

4. The method of claim 1 wherein the aqueous alkaline solution contains total carbonate values in a concentration less than 1.2 molar.

5. The method of claim 1 wherein the aqueous alkaline solution contains total carbonate values in a concentration of 0.5 to 1.0 molar.

6. The method of claim 1 wherein the aqueous alkaline solution is formed by dissolving a precipitate containing beryllium hydroxide with an aqueous solution containing bicarbonate values.

7. The method of claim 1 wherein R' is an aryl radical, R" is a methyl radical, and R''' contains at least 17 carbon atoms.

8. The method of claim 1, wherein R', R", and R''' are selected from n-octyl and n-decyl groups.

9. The method of claim 1 wherein the beryllium-containing organic solution is scrubbed with an aqueous solution containing total carbonate values in a concentration of 0.1 to 0.5 molar.

10. The method of claim 1 wherein beryllium values are removed from the beryllium-containing organic solution by contacting said organic solution with an aqueous solution containing bicarbonate values in a concentration of 1.5 to 2 molar.

References Cited

UNITED STATES PATENTS

| 3,131,994 | 5/1964 | Surls | 23—312 X |
| 3,288,559 | 11/1966 | Biermann | 23—312 X |
| 3,359,064 | 12/1967 | Crouse | 23—24 X |
| 3,360,344 | 12/1967 | Bourat | 23—312 X |

OTHER REFERENCES

"Technology," Chemical and Engineering News, Apr. 19, 1965, vol, 43, #16, pp. 70–71.

Wilson, Analytical Chemistry, vol. 34, #2, February 1962, pp. 203 to 207.

NORMAN YUDKOFF, Primary Examiner

S. J. EMERY, Assistant Examiner

U.S. Cl. X.R.

23—18, 24, 66; 260—567.6